(12) United States Patent
Kunstreich et al.

(10) Patent No.: US 8,011,417 B2
(45) Date of Patent: Sep. 6, 2011

(54) PROCESS FOR THE CONTINUOUS CASTING OF FLAT METAL PRODUCTS WITH ELECTROMAGNETIC STIRRING AND IMPLEMENTATION INSTALLATION

(75) Inventors: Siebo Kunstreich, Saint Ouen (FR); Dominique Yves, Paris (FR)

(73) Assignee: Rotelec, Bagnolet (FR)

( * ) Notice: Subject to any disclaimer, the term of this patent is extended or adjusted under 35 U.S.C. 154(b) by 393 days.

(21) Appl. No.: 12/299,624

(22) PCT Filed: Jul. 7, 2006

(86) PCT No.: PCT/FR2006/001693
§ 371 (c)(1),
(2), (4) Date: Nov. 5, 2008

(87) PCT Pub. No.: WO2008/003838
PCT Pub. Date: Jan. 10, 2008

(65) Prior Publication Data
US 2009/0183851 A1 Jul. 23, 2009

(51) Int. Cl.
*B22D 11/115* (2006.01)
*B22D 27/02* (2006.01)
(52) U.S. Cl. .................................. 164/468; 164/504
(58) Field of Classification Search .............. 164/466, 164/468, 502, 504
See application file for complete search history.

(56) References Cited

U.S. PATENT DOCUMENTS

| | | | | |
|---|---|---|---|---|
| 4,106,546 A | * | 8/1978 | Sundberg | 164/468 |
| 4,178,979 A | * | 12/1979 | Birat et al. | 164/468 |
| 4,562,879 A | | 1/1986 | Birat et al. | |
| 4,706,735 A | * | 11/1987 | Mizota et al. | 164/504 |

FOREIGN PATENT DOCUMENTS

| | | |
|---|---|---|
| AT | 331 436 | 8/1976 |
| EP | 0 097 561 | 1/1984 |

OTHER PUBLICATIONS

Birat, et al., "Utilization of IRSID-CEM Stirring Rolls on Usinor's Slab Caster for Plate Grades in Dunkirk", Cahiers D'Informations Techniques De La Revue De Metallurgie, vol. 80, No. 2, pp. 119-135 (1983).*

Birat, J.-P. et al., "Utilisation De Rouleaux Brasseurs IRSID-CEM Sur La Machine De Coulee Continue D'Usinor Dunkerque Produisant Des Brames Pour Toles Fortes", Cahiers D'Informations Techniques De La Revue De Metallurgie, vol. 80, No. 2, pp. 119-135 (1983).

\* cited by examiner

*Primary Examiner* — Kuang Lin
(74) *Attorney, Agent, or Firm* — Oblon, Spivak, McClelland, Maier & Neustadt, L.L.P.

(57) ABSTRACT

A process for continuous casting of slabs or other metal products of elongate cross section, for example made of steel, in which a molten metal is poured into a cooled mold, and the externally solidified product is continuously extracted from the mold and guided in a secondary cooling zone downstream of the mold. To obtain a cast product exhibiting predominantly equiaxed solidification, the product extracted from the mold is subjected to electromagnetic stirring in segment zero of the secondary cooling zone by at least two stirrer-rolls incorporated into the segment zero.

10 Claims, 4 Drawing Sheets

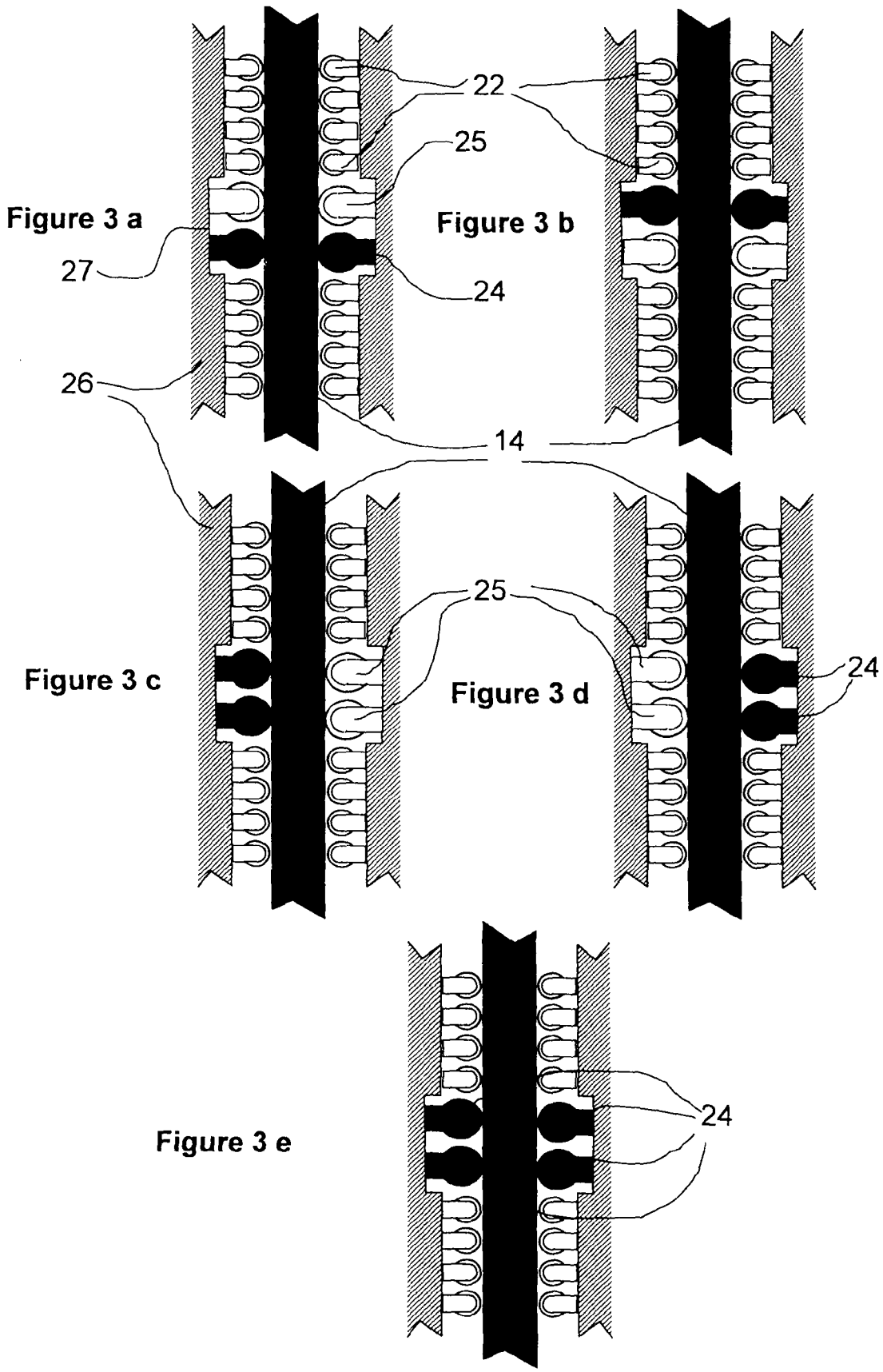

PROCESS FOR THE CONTINUOUS CASTING OF FLAT METAL PRODUCTS WITH ELECTROMAGNETIC STIRRING AND IMPLEMENTATION INSTALLATION

BRIEF SUMMARY

The present invention relates to the field of continuous casting of metals, especially steel. It relates more particularly to the continuous casting of flat products, namely slabs and other similar products of elongate cross section, during which moving magnetic fields acting on the molten cast metal are used to improve the quality of the cast product obtained and/or the conditions or performance characteristics of the casting process itself.

DISCUSSION OF THE BACKGROUND ART

It will be briefly recalled here that a continuous casting operation consists in pouring a molten metal downwards into a bottomless mould essentially consisting of a metal mould body (made of copper or a copper alloy), generally consisting of assembled plates for the casting of flat products, defining a passage for the cast metal. The walls are vigorously cooled by the circulation of water so as to continuously extract, via the base of this mould, a product that has already solidified on the outside over a few millimetres of thickness. The solidification progresses from the periphery before finally reaching the centreline of the product during is descent downstream of the mould in what is called the "secondary cooling" zone, in which zone the cast product, guided by support and guide rolls (hereafter called support rolls), is sprayed with water in order to extract the heat necessary for its complete solidification. The solidified product thus obtained is then cut to length, then rolled before being shipped to the customer or converted on site into plate products, sheet products, etc.

In the case of flat metal products, and therefore of elongate cross section, commonly called slabs, it has already been known for a long time to effect electromagnetic stirring of the molten metal in the secondary cooling zone of the continuous casting plant.

Schematically, the electromagnetic stirring consists, as is known, in subjecting the slab to one or more moving magnetic fields (that is to say fields in which the maximum intensity moves over time in a defined direction in space), the action of which on the molten metal is therefore manifested by entrainment of the metal identical, in sense and direction, to the displacement of the magnetic field.

In the case of casting flat products, the liquid metal is generally entrained using linearly moving magnetic fields, called travelling fields, undergoing a horizontal translational movement parallel to the broad faces of the product.

The travelling magnetic field is created by a polyphase linear inductor, which is placed as close as possible to the slab so as to maximize the electromagnetic coupling with the latter.

For this purpose, the inductor may be mounted either behind the support rolls, in a solution called a "box-type stirrer", or inside a support roll, made hollow for this purpose, in the secondary cooling zone, a solution called a "stirrer-roll" or an "in-roll stirrer".

The two solutions have coexisted on the market since the beginning of the 1980s and have been used right from the start to improve the internal soundness of the cast metal. This is because, thanks to the stirring, the natural crystalline growth of the "dendritic" type from the outside towards and right to near the centreline of the product is interrupted to the benefit of the development of a finer non-oriented solidification structure, called "equiaxed" structure. This thus results in a reduction in the central porosity and a simultaneous reduction in axial macrosegregation (see European Patent 0 097 561). This improvement in the internal soundness was essentially sought for steel grades that are rolled with a low deformation ratio in order to become heavy plate products.

It has been discovered that to achieve, in the secondary cooling zone of a steel slab caster, optimum stirring as regards internal soundness of the product obtained, it is necessary to stir not only in a single localized position but, on the contrary, at least twice over the metallurgical length, that is to say to carry out staged stirring.

It is this that specifically the aforementioned EP 0 097 561 B2 proposes, which patent describes a method for electromagnetically stirring continuously cast steel slabs, in which a plurality of travelling magnetic fields produced by pairs of staged stirrer-rolls are made to act over the metallurgical length, the space between the upper pair and the lower pair being from 1 to 2 metres. Thus, based on a set of four stirrer-rolls in total, the pair of stirrer-rolls closest to the mould is located about 5 to 7 m below the free surface of the liquid metal in the mould and the second pair of stirrer-rolls, located as close as possible to the bottom of the solidification well, is placed at about 4 to 6 m from this bottom. The power supply for the rolls is furthermore regulated so that the magnetic field created by the upper pair travels in the opposite direction to that of the magnetic fields created by the lower pair.

According to that teaching, the stirrer-rolls are thus mounted in the region of the secondary cooling zone, in what are called the "lower segments" of the caster. They are substituted for the support rolls normally provided at these points and therefore have a geometry, especially an outside diameter, identical, or in all cases approximately identical, to that of the adjacent rolls which, in this secondary cooling zone, typically have a diameter of at least 230 mm.

The staged stirring is generally carried out with stirrer-rolls, although in principle is could also be carried out with two box-type stirrers. However, the latter are markedly more expensive as they require about five times more electrical power because of their distance from the surface of the slab, so that staged stirring with box-type inductors would be prohibitively costly.

This electromagnetic stirring technique in the secondary cooling zone, although very widely used throughout the world to improve the quality of heavy plate products, was replaced in the 1990s with a competitive technique called "soft mechanical reduction". This may in fact be compared to a soft rolling step already in casters, so as to force the solidification fronts on each side of the broad faces of the slab to come together and thus reduce the central porosity and the central segregation more effectively than with electromagnetic stirring.

Consequently, electromagnetic stirring in the secondary cooling zone is practically no longer used at the present time, except in the case of stainless steels and silicon steels, and then for a different metallurgical purpose. This is because there is a problem specific to the continuous casting of these steel grades for which there are often observed, on the products obtained after rolling or drawing, surface defects of the "roping" or "ridging" type, which are manifested by a wavy surface appearance. Such a surface is optically unsatisfactory in the case of stainless steels and, in the case of silicon steels, creates compactness problems in stacks for the production of laminations for transformer or motor yokes.

However, it is already known that this roping and ridging problem may be eliminated if the slab has a solidification structure with a very high fraction, i.e. at least about 50%, of the equiaxed type. Theoretically, it would be possible to obtain such a result by casting the metal with an extremely low level of superheat, but in practice this is impossible in continuous casting and therefore electromagnetic stirring is required in order to rapidly extract this superheat.

Contrary to heavy plate products, for which the porosity and axial segregation must be minimized, the aim here is to maximize the extent of the equiaxed solidification fraction. This is the reason why the stirring must be raised towards the top in the secondary cooling zone in order to be as close as possible to the mould in segment zero of the caster.

It will be recalled that "segment zero" is that segment which receives the cast product directly on leaving the foot rolls of the mould. It defines a particular portion of the metallurgical length that extends over a distance of about 3 to 4 m from the mould exit. This portion, formed by a tight battery of small-diameter (typically around 150 mm) support rolls, is considered to be particularly critical by caster manufacturers. This is particularly so as regards the small spacing between the contact generatrices and the regularity of the mechanical support for the slab, the solidified metal shell of which, which is still relatively thin, runs the risk of bulging in the space between two successive mechanical support rolls as it is subjected to an already high ferrostatic pressure at this point.

It is therefore in order not to locally modify the regularity and the small spacing of the rolls supporting slab in segment zero that electromagnetic stirring by means of box-type inductors placed behind these small support rolls is proposed therein, whereas fitting stirrer-rolls of substantially larger diameter would involve a discontinuity in the spacing of the support rolls.

However, box-type stirring requires that any metal structure present between the inductor and the slab to be made of non-magnetic steel so as not to form a screen to the acting magnetic field. This involves modifying segment zero when the aim is to introduce stirring in existing casters, or a specially designed segment zero, which is therefore more expensive, when producing new casters. Furthermore, despite the small diameter of around 150 mm of the support rolls in segment zero, the distance between the slab and the box-type inductor cannot be reduced to below 270 to 250 mm because of the mechanical structure behind the support rolls, which structure supports the intermediate bearings for these rolls. As already explained above, this imposed distance between inductor and cast product greatly degrades the electromagnetic coupling between the two, and as a compensation requires a great increase in electrical power.

The state of the art in the case of stainless steels and silicon steels is therefore characterized by: (i) localized stirring in segment zero of the caster in order to obtain an equiaxed zone width of about 50% or more of the thickness of the slab; (ii) use of box-type inductors behind the small support rolls, in order not to locally modify the diameter and the position of said rolls; (iii) consequently, limiting stirring to a single non-staged stirring operation for cost reasons, although staged stirring gives better results; and (iv) impossibility of varying the position of the stirrer for a given segment zero.

SUMMARY

The object of the present invention is to propose, for implementing electromagnetic stirring in segment zero, a solution that does not have the above-mentioned drawbacks.

For this purpose, one subject of the present invention is a process for the continuous casting of flat metal products with electromagnetic stirring by a magnetic field travelling over the width of the broad faces of the cast product, which process is characterized in that, for the purpose of obtaining a cast product having a predominantly equiaxed solidification structure (i.e. over more than 50% of the width of the slab), said electromagnetic stirring is carried out in segment zero of the secondary cooling zone of the caster by means of at least two stirrer-rolls that are inserted among the support rolls of the battery making up said segment and that generate magnetic fields travelling in the same direction.

This predominantly equiaxed internal solidification structure improves the behaviour of the metal during rolling and prevents defects of the roping or ridging type, thereby making the process according to the invention particularly well suited for the continuous casting of flat products made of ferritic stainless steel or silicon steel. However, the process is of course also applicable to carbon steels in general.

Apart from the effect on the solidification structure of the slab, the stirring in segment zero is advantageous in that it allows better control of the superheat of the metal upon casting.

It should be noted that by using stirrer-rolls in segment zero, which therefore take the place of support rolls of substantially smaller diameter, the process according to the invention goes counter to the usual practice, the intention of which is for segment zero to consist exclusively of small rolls, in order to maximize the number of contact generatrices with the surface of the slab during casting, and therefore to maximize the mechanical support for said slab, and which means that a discontinuity in support roll diameter, implying a discontinuity in slab support, inexorably results in excess bulging of the slab, which is the origin of the cracks observed in the solidified shell.

The inventors have demonstrated, in industrial operation, that, contrary to the doctrine of those skilled in the specialist art of continuously casting products of elongate cross section, it is quite possible to introduce inductors in segment zero of the caster by replacing the small support rolls with stirrer-rolls, and consequently introducing a discontinuity in support for the slab, without correspondingly compromising in any way the continuous casting process and especially without producing cracks. Apparently, it seems that it is the effect of the movement of the liquid metal caused by the stirring that prevents the formation of cracks, even though the bulging of the slab is locally higher.

According to the base variant of the present invention, the stirrer-rolls are used in pairs.

To promote a concentration of the magnetic field across the slab, the two stirrer-rolls constituting a pair will be placed at the same level, facing each other, each on a broad face of the slab. However, to promote an increase in the length of action of the stirring along the casting direction, they will be placed side by side, directly adjacent one above the other, in order to bear on the same broad face of the slab.

According to another variant, when very high stirring power is required for particular applications, two neighbouring pairs of stirrer-rolls are used, hence two rolls placed side by side, one above the other, on each of the two broad faces of the slab.

According to a preferred variant, the diameter of the stirrer-rolls will be chosen so that two stirrer-rolls placed side by side will approximately take the place of three consecutive support rolls. This important arrangement makes it possible to introduce any of the aforementioned embodiments into the same segment zero so as to be able to keep unchanged the positions, on each side of the slab, of all the support rolls except for three successive rolls (those which are replaced) and to keep the total length of segment zero constant.

As an example, for support rolls with a 150 mm diameter, placed with a centre-to-centre spacing of 180 mm (i.e. a free space of 30 mm between two rolls), a spacing of 3×150 mm+2×30 mm, i.e. 510 mm, will be used for fitting two stirrer-rolls of diameter 2×D+30 mm=510 mm, therefore D=240 mm.

The choice of a 240 mm diameter for the stirrer-rolls in the example chosen therefore makes it possible to modify a segment zero so as to be able to fit either a face-to-face pair or a side-by-side pair, or else two pairs of stirrer-rolls grouped together without changing the length of segment zero and the positions of the other, conventional support rolls.

It will be understood that the choice of outside diameter D for the stirrer-rolls will be approximately given by the formula 2D+e=3d+2e, where e is the space between two rolls, which is approximately identical for the stirrer-rolls and the support rolls, and where d is the diameter of the support rolls.

This flexibility in the choice of stirring configuration is one particularly important aspect of the invention, since the operator of the continuous caster can then readily optimize the metallurgical results according to the choice of a pair of stirrer-rolls face to face or side by side, or two grouped pairs.

Another subject of the present invention is a plant for the continuous casting of flat products, which includes a mould and a secondary cooling zone downstream of the latter, and in which segment zero of the secondary cooling zone includes at least two stirrer-rolls inserted among the usual support rolls that make up this segment.

According to a preferred embodiment, the diameter of the stirrer-rolls is chosen according to the formula explained above, namely 2D+e=3d+2e so as to be able to fit either two stirrer-rolls face to face or side by side, or four stirrer-rolls grouped in pairs on each broad face.

It turns out that the stirring effect depends strongly on the position of the stirrer in segment zero, that is to say on the distance separating the stirrer from the mould. The optimum position will be chosen according to the solidification profile of the slab, which itself depends on the casting conditions, such as the casting rate, cooling intensity, superheat of the steel, etc. For example, when the casting rate is slow, it will be preferred to fit the stirrer in the highest part of segment zero. After having chosen the position and adapted a segment zero in order to fit a stirrer in said segment at this position (it matters little here whether this is a box-type stirrer or stirrer-rolls), it will then be absolutely necessary always to reproduce the same casting conditions so that the solidification profile remains unchanged and the chosen position remains correct. Thus the flexibility in modifying the casting parameters will be lost, or else it will be necessary once again to change segment zero.

Thus, according to one advantageous embodiment of the plant, the structure of segment zero is designed so as to be able to change the position of the stirrer-rolls while keeping the same segment zero.

For this purpose, the standard main support beam on which each roll bears, and to which its bearing is appropriately fastened, is no longer used, but, each time, three support rolls are grouped together on a supporting baseplate, these baseplates themselves bearing on and fastened to the main support beam. The height of the baseplate is equal to the excess height of the stirrer-roll with its bearing relative to the support roll and its bearing.

Such a structure of removable supporting baseplates rigidly fastened to the main beam offers the structural flexibility of being able to replace any triplet of support rolls with a doublet of larger-diameter rolls, either a pair of stirrer-rolls, or a stirrer-roll and a dummy roll of the same diameter, depending on whether a pair of stirrer rolls placed face to face or side by side is used or whether two grouped pairs are used.

This flexibility in the choice of location and the ease of fitting is one aspect of the invention that may prove to be particularly important, since the operator of the continuous caster can therefore readily optimize the position of the stirrer-rolls in segment zero when he has modified his casting conditions.

BRIEF DESCRIPTION OF THE DRAWINGS

Other features and characteristics of the invention will become more clearly apparent from the following detailed description of a few embodiments presented by way of illustration, and with reference to the appended plates of drawings in which:

FIGS. 3a to 3e each show the battery of support rolls in segment zero with insertion of four stirrer-rolls grouped together, of larger diameter, and one of the five stirring configurations that can be achieved in segment zero.

DETAILED DESCRIPTION

FIG. 1 shows schematically a plant for the continuous casting of steel slabs, comprising a mould 10 and, downstream of it, a secondary cooling zone 12. The mould 10, of the type consisting of assembled plates, the broad plates of which are vigorously cooled by the circulation of water over their external surface, defines a casting passage of rectangular elongate cross section, imposing its shape on the as-cast slab that will be produced. The mould is fed from the top with molten metal by means of a submerged nozzle (not shown) and a slab preform 14, partially solidified on the outside, is continuously extracted from the mould 10. On exiting the mould, the slab 14 enters the secondary cooling zone 12 where it is guided and supported by support rolls, while being cooled by water jets (not shown).

Figures 1A, 1B:
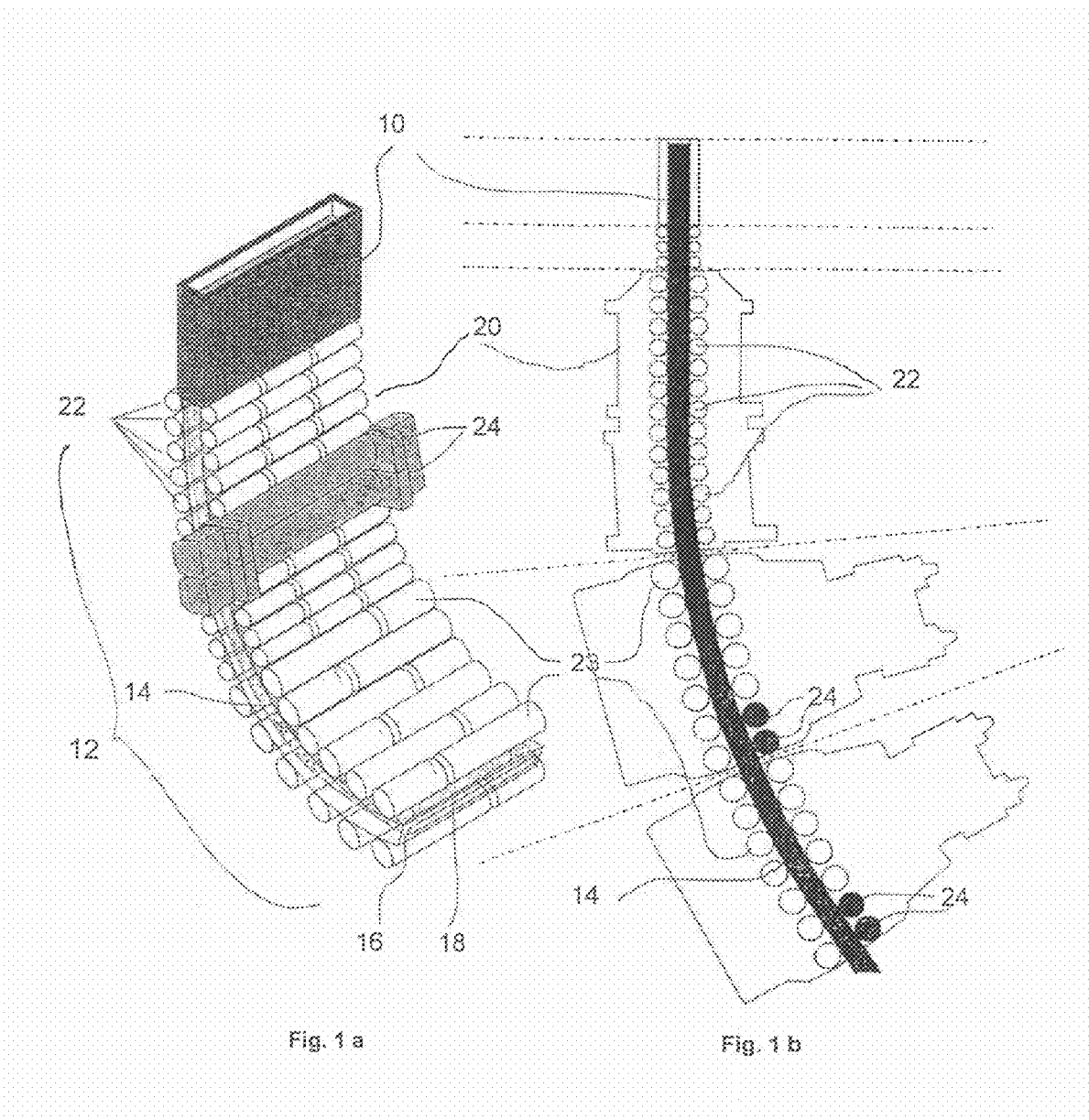
FIGS. 1a and 1b are a schematic view in perspective of the upper part of a continuous caster with a mould and segments of the secondary cooling zone.

It should be noted that FIG. 1a shows only part of the secondary cooling zone 12 corresponding to the regions usually called "segment zero" and "segment 1", while in addition FIG. 1b shows "segment 2", i.e. a metallurgical length of about 7 to 8 m. In this secondary cooling part 12, the slab 14 is only partially solidified and therefore comprises a solidified shell 16, as yet rather thin, and a broad liquid core 18.

As a reminder, segment zero, indicated by 20 in FIG. 1, corresponds to the secondary cooling zone 12 directly beneath the mould 10 and extending over a distance of around 3 m. Segment zero conventionally comprises guide rolls, indicated by 22, of small diameter, generally around 150 mm. Typically, there are between eight and 16 guide rolls on each of the broad faces of the slab.

Segments 1, 2, . . . etc. therefore correspond to secondary cooling regions downstream of segment zero which are typically equipped with larger-diameter guide/support rolls 23. For example, segments 1 and 2 each extend over a distance of around 1.5 to 2 m after segment zero.

FIG. 1a shows a pair of stirrer-rolls 24 in a side-by-side configuration in a position relatively close to the mould, such as that used for stirring stainless steel and silicon steel, thereby making it possible to produce a slab 14 with a large equiaxed solidification fraction, greater than 50% in thickness, in accordance with the present process.

In contrast, FIG. 1b shows staged stirring with a pair of stirrer-rolls 24 side by side in segment 1 and a second pair 24 in segment 2, in a relatively low position normally used for heavy plate steel.

FIG. 1b shows a modern caster, in which the mould is provided with foot rolls, the mould and the first part of segment zero are straight and vertical, segment zero is relatively long, and the secondary cooling zone curvature starts at the bottom of segment zero.

FIG. 1a shows a caster of older design with a shorter, entirely curved, segment zero. Casters of this type often have curved moulds.

As is known, stirrer-rolls are, schematically, guide/support rolls made tubular so as to contain a travelling-field electromagnetic inductor, which is therefore placed very close to the slab. The stirrer-rolls typically have a diameter of greater than 230 mm, which is therefore substantially larger than that of a segment zero roll. However, since the design details of these stirrer-rolls do not form a specific part of the invention and are well known in the field, they will not be described here in detail. The reader may for example refer to EP 0 053 060 for further details about their design and technology, especially as regards the inductor.

Segment zero stirring is used in a position that still includes a predominantly liquid steel part in the thickness direction of the slab. This therefore makes it possible to achieve predominantly equiaxed solidification, the thickness of which corresponds to more than 50% of the thickness of the slab, this equiaxed central zone being bordered by two columnar (or dendritic) zones. A predominantly equiaxed crystalline structure prevents roping and ridging problems that are observed after rolling with steel grades of the ferritic stainless steel or silicon steel type.

The use of stirrer-rolls instead of a box-type stirrer (not shown) makes it possible to fit the inductor much closer to the slab, consequently to obtain better electromagnetic coupling, and to reduce by a factor of about five the electrical power requirements and therefore to achieve markedly less costly stirring.

This is because the cost of a single box-type stirrer is generally greater than that of four stirrer-rolls and this makes it possible to use, for a lower cost, staged stirring: two stirrer-rolls in segment zero followed by two stirrer-rolls in segment one or in segment two. Staged stirring gives better results than a single stirrer, since it generates more extensive movement of the liquid steel in the secondary cooling zone, consequently provides better heat exchange between the hotter steel at the top and the cooler steel at the bottom of the secondary cooling zone, and better removes the superheat of the steel. Therefore better metallurgical results are obtained, while gaining operational flexibility in the casting as it is possible to accept steel cast with greater superheats.

Figure 2:
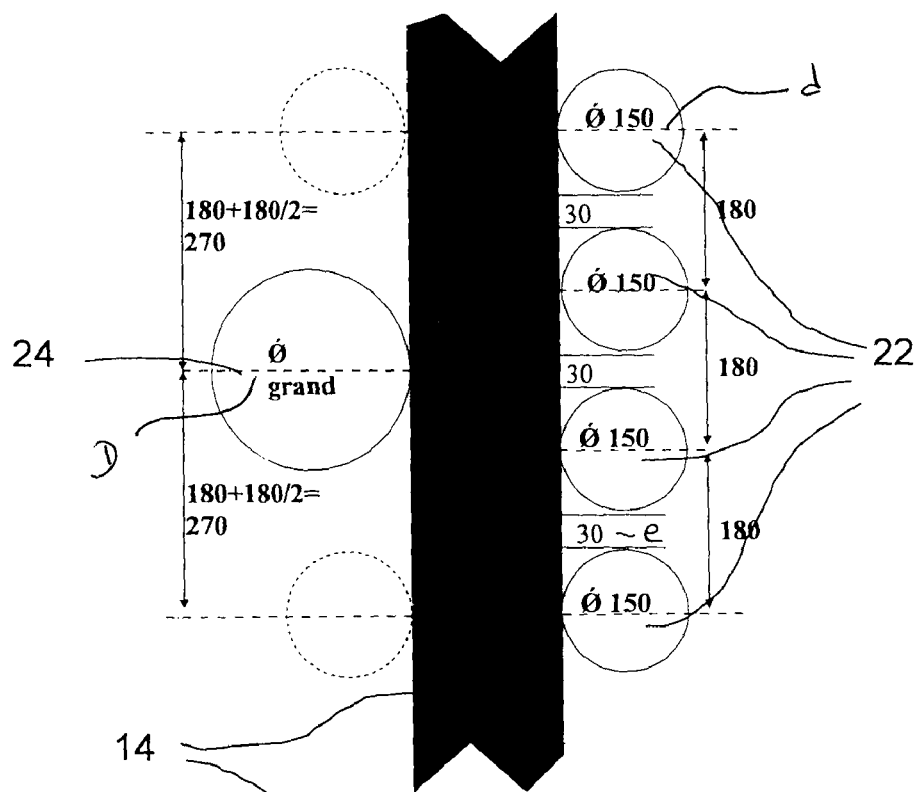
FIGS. 2a and 2b show the choice of diameter D for the stirrer-rolls and dummy rolls as a function of the diameter d of the support rolls and their spacing.

FIG. 2 illustrates the difficulty of inserting substantially larger-diameter rolls in segment zero. As an example, support rolls (22) with a diameter of 150 mm and a centre-to-centre spacing of 180 mm have been chosen. The insertion of a single stirrer-roll (24) in the battery of support rolls (22) requires the removal of two support rolls (22), thereby increasing the support spacing from 180 to 270 mm (FIG. 2a). Two spacings of 270 mm among the battery of 180 mm spacings are deemed prohibitive for reasons of slab bulging. For a configuration consisting of a pair of stirrer-rolls face to face, this spacing could be reduced from 270 to 225 mm. This would be acceptable from the standpoint of slab bulging, but it would require shortening the segment zero length by 2×(270−225)=90 mm, which would not be possible for an existing caster as it would necessitate redesigning the entire secondary cooling zone. The 90 mm could still be distributed over all the support rolls, but this would require readjusting all the rolls, and therefore producing a new segment zero. In all cases, one would be limited to the configuration of a pair of face-to-face stirrer-rolls.

Figure 2B:
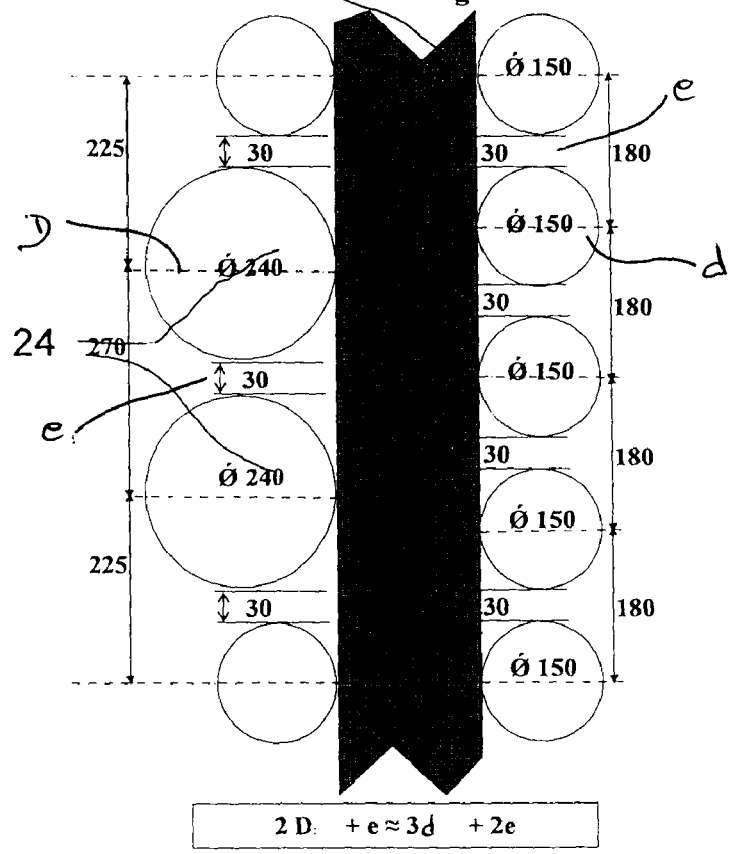

If it is desired to have the freedom of, being able to use a pair of stirrer-rolls in a face-to-face configuration or a side-by-side configuration, or even to use two pairs of rolls grouped together when a special application requires additional stirring power, it is necessary to insert two stirrer-rolls (24) in the battery of support rolls (22), as shown in FIG. 2b.

The diameter must therefore be chosen using the formula: $2D+e \approx 3d+2e$, where D and d are the diameters of the stirrer-rolls (24) and the support rolls (22) respectively, and e is the spacing between rolls, taken to be approximately equal for the stirrer-rolls and for the support rolls. In the example chosen, a diameter D of 240 mm is obtained for the stirrer-rolls. The slab support spacing will change in succession from 180 mm to 225 mm, 270 mm, then 225 mm and 180 mm, which is much better as regards slab bulging than the series 180, 270, 270 and 180 mm of the example shown in FIG. 2a.

To summarize, by choosing the diameter D of the stirrer-rolls according to the diameter d of the support rolls using the above formula and by inserting four stirrer-rolls of this diameter D, a more favourable situation as regards slab bulging will be obtained together with the flexibility of being able to charge stirring configuration with the same segment zero.

FIG. 3 shows schematically the segment zero structure consisting of large support beams (26) placed on either side of the broad faces of the slab and supporting the end bearings of the support rolls (22) and of the stirrer-rolls (24) or dummy rolls (25). Although this is not shown in FIG. 3, the support rolls (22) may furthermore be supported at one or two places along their length by intermediate bearings (see FIG. 4). FIG. 3 shows a segment zero part of straight vertical shape, but it is understood that this part could also be curved.

FIG. 3 shows the five stirring configurations that can be achieved with the same segment zero: stirring with a pair of stirrer-rolls (24) face to face in two different positions (FIG. 3a and FIG. 3b); stirring with a pair of stirrer-rolls side by side (FIG. 3c and FIG. 3d); and stirring with two pairs of stirrer-rolls grouped together (FIG. 3e). The four first configurations shown in FIGS. 3a to 3d use, in addition to a pair of stirrer-rolls (24), a pair of dummy rolls (25) of the same diameter. In this way, very great flexibility is achieved in the choice of magnetic field stirring, either concentrated across the thickness of the slab (FIG. 3a and FIG. 3b) or lessened across the slab but applied over a longer length (FIG. 3c and FIG. 3d), or extremely powerful stirring (FIG. 3e).

FIG. 3 also shows that the support beams (26) for the bearings of the rolls must be remachined with a notch (27) at the point of insertion of the rolls of larger diameter D and that, once this modification has been made, the position of the stirrer-rolls (and dummy rolls) can no longer be modified.

Figure 4:
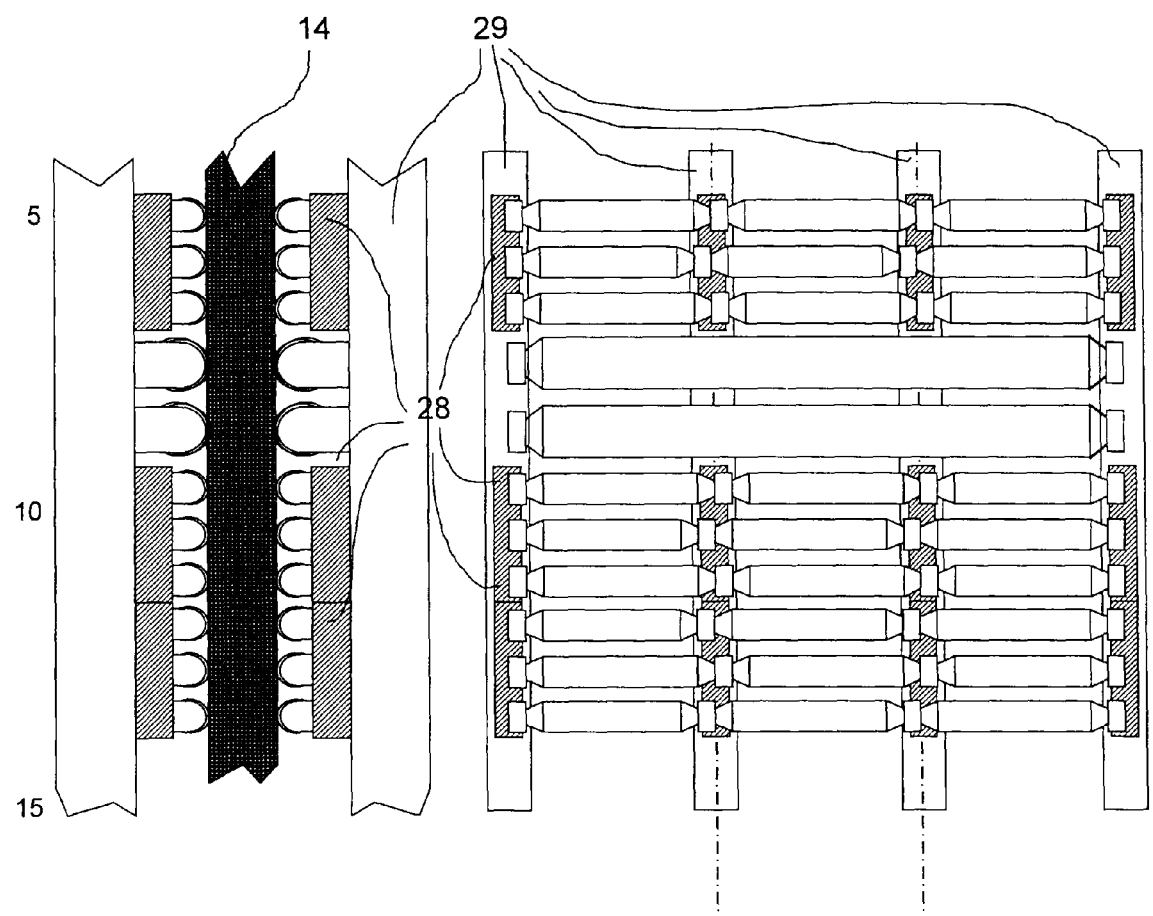
FIG. 4 shows the design of segment zero with its support structure divided into baseplates and main beam according to the invention.

Finally, FIG. 4 shows a design of the segment-zero structure in which the main support beam (26) is divided into (i) a number of baseplates (28) each serving for grouping three support rolls (22) together and (ii) a main beam (29) serving for supporting and fastening the baseplates (28).

Given that the length of the baseplates is identical to the space without a baseplate taken up by two stirrer-rolls or dummy rolls, their location can be easily changed against a baseplate by removal/refitting, without it being necessary to reconstruct a new segment zero. Thus, it will be possible to readapt the position of the electromagnetic stirring and to optimize the metallurgical results when the casting conditions, and especially the casting rate, have been changed because the operating conditions have been modified.

It should be noted that the baseplates (28), like the surface of the main beam (29), have been shown as being straight, although they may be curved. It should also be noted that the height of the baseplates (28) is at least equal to the depth of the notch (27) (or equal to the difference in height of the roll/bearing assembly between stirrer-roll (24) and support roll (22). This is the same if the stirrer-rolls/dummy rolls are fastened directly to the main beam (29). It is greater if the stirrer-rolls/dummy rolls are also mounted on a baseplate.

It goes without saying that the invention is not limited to the examples described above, rather it extends to many variants and equivalents provided that its definition given by the following claims is respected.

The invention claimed is:

1. A process for the continuous casting of flat metal products, comprising:
   pouring a molten metal into a mold;
   continuously extracting and guiding an externally solidified cast product from the mold using a battery of support rolls in a secondary cooling zone downstream of the mold; and
   subjecting the cast product extracted from said mold to an electromagnetic stirring by a travelling magnetic field acting in a segment zero of said secondary cooling zone by at least two stirrer-rolls that are present at least within said battery of support rolls and that generate magnetic fields travelling in a same direction, to obtain the cast product having a solidification structure predominantly of the equiaxed type,
   wherein the diameter "D" of said stirrer-rolls approximately satisfies the equation: $2D+e=3d+2e$, with "d" being a diameter of said support rolls and "e" being a free space between two consecutive rolls, and in which said segment zero is configured to insert, into the battery of support rolls, four rolls of said diameter "D", including at least two stirrer-rolls and two dummy rolls, said four rolls being placed in a group at a same level, two on each broad face of the cast product.

2. A process according to claim 1, wherein said two stirrer-rolls are placed at a same level, facing each other, each one on a broad face of the metal product.

3. A process according to claim 1, wherein said two stirrer-rolls are adjacent, side by side on a same broad face of the metal product.

4. A process according to claim 1, wherein two stirrer-rolls are used, being placed in a group at a same level, each on a broad face of the metal product.

5. A process according to claim 1, wherein the cast product is a stainless steel or a silicon steel.

6. A process according to claim 1, wherein a position of the stirrer-rolls in the segment zero is chosen according to at least one operational parameter of the continuous casting.

7. A plant for the continuous casting of flat metal products, comprising:
   a mold; and
   a secondary cooling zone including successive segments of batteries of support rolls,
   wherein a segment zero of said secondary cooling zone includes at least two stirrer-rolls, and wherein the diameter "D" of said stirrer-rolls approximately satisfies the equation: $2D+e=3d+2e$, with "d" being a diameter of said support rolls and "e" being a free space between two consecutive rolls, "e" being approximately the same for stirrer-rolls and support rolls, and said segment zero is configured to insert, into the battery of support rolls, four rolls of said diameter "D", including at least two stirrer-rolls and two dummy rolls, the four being placed in a group at a same level, two on each broad face of the metal product.

8. A plant according to claim 7, wherein said two stirrer-rolls are placed at a same level, facing each other, each one on a broad face of the cast metal product.

9. A plant according to claim 7, wherein said two stirrer-rolls are adjacent, side by side, on a same broad face of the cast metal product.

10. A plant according to claim 7, wherein said two adjacent stirrer-rolls placed in a group at a same level, each on a broad face of the metal product.

* * * * *